United States Patent [19]
Howard et al.

[11] 3,818,760
[45] June 25, 1974

[54] LIQUID-CONTENTS GAUGING SYSTEMS

[76] Inventors: Anthony Stonham Howard, 3 Springhill, Elstead, Godalming, Surrey; Ivan Boris David Johnson, 26 Rydes Hill Rd., Guildford, Surrey, both of England

[22] Filed: Nov. 24, 1971

[21] Appl. No.: 201,645

[30] Foreign Application Priority Data
Nov. 25, 1970 Great Britain.................... 56079/70

[52] U.S. Cl.............. 73/291, 73/304 C, 235/92 FL, 235/150.21, 235/151.34
[51] Int. Cl....................... G01f 23/26, G06f 15/50
[58] Field of Search....... 73/291, 304 C; 235/92 FL, 235/150.21, 151.34

[56] References Cited
UNITED STATES PATENTS

| | | | |
|---|---|---|---|
| 3,029,641 | 4/1962 | Andrews............................... | 73/291 |
| 3,120,124 | 2/1964 | Seliger et al........................ | 73/291 |
| 3,301,056 | 1/1967 | Blanchard et al................ | 73/304 C |
| 3,361,897 | 1/1968 | Rush............................ | 235/150.21 |
| 3,566,685 | 3/1971 | Zimmerman et al. ..... | 235/151.34 X |

FOREIGN PATENTS OR APPLICATIONS

| | | | |
|---|---|---|---|
| 634,566 | 1/1962 | Canada............................ | 73/304 C |

*Primary Examiner*—Richard C. Queisser
*Assistant Examiner*—Frederick Shoon
*Attorney, Agent, or Firm*—George Vande Sande

[57] ABSTRACT

An aircraft fuel-gauging system includes a counter that is repeatedly reset and then pulsed to a count appropriate to a continuous measurement of fuel-mass provided by a capacitance gauge. The pulsing and re-setting operations of the counter are interrupted whenever an inertial sensor detects change in aircraft attitude or speed in excess of a predetermined threshold value for which there is inertial error in the capacitance-gauge measurement, and the count retained in the counter at the commencement of the period of interruption is up-dated continuously through that period by pulse signals supplied by one or more flowmeters in accordance with the rate of mass-change in fuel content. Two switches for overriding the interruption of the pulsing and resetting operations are provided, one for operation while the aircraft is on the ground and the other whenever desired by the aircrew.

9 Claims, 3 Drawing Figures

LIQUID-CONTENTS GAUGING SYSTEMS

This invention relates to liquid-contents gauging systems.

The invention is particularly concerned with liquid-contents gauging systems for use in craft and is especially applicable to fuel-gauging systems for aircraft.

The measurement of fuel content in aircraft is generally based on measurement of electrical capacitance exhibited by electrical probes mounted in the aircraft fuel-tanks. The capacitance of each probe varies in dependence upon the extent to which it is immersed in the fuel, and since the fuel tanks are generally of irregular shape it is normally necessary in order to obtain useful measurement of fuel quantity in terms of either volume or mass, to profile or 'characterise' the probe electrodes such that the incremental change in capacitance that results from an incremental change in volume- or mass-content is substantially constant throughout the length of each probe when the aircraft is in its normal lefel-flight attitude. Departure from this attitude tends to introduce error into the measurement by changing the fuel level, and therefore the extent of probe immersion, within each tank. The error can generally be reduced by the use of several probes in each tank and careful choice of their location in relation to the shape of the tank and the range of attitude variation that can be expected. These steps also serve to reduce error comparable with attitude error that arises, more especially in military aircraft, from change in fuel level brought about by change in speed. There are, however, practical limitations on the number of probes that can be provided and on their location in the tanks, and so the extent to which attitude and comparable errors can be reduced is limited. It is an object of the present invention to provide a liquid-contents gauging system that can be used to overcome the difficulty.

According to the present invention there is provided a liquid-contents gauging system for use in a craft, in which a representation of liquid content is provided in accordance with a measure of content which is dependent on liquid level and which is subject to error arising from temporary disturbance in level induced by predetermined variation in craft attitude and, or alternatively, speed, wherein it is arranged that said representation is provided during the period of such disturbance in accordance with a value of said measure applicable prior to commencement of said period and modified in accordance with quantity changes in said content through said period.

The system may include a capacitance liquid-contents gauge to provide the measure of content, and one or more flowmeters to provide a measure of the quantity changes in content during the period of any attitude or speed variation exceeding a predetermined threshold value, sensed by an inertial or other sensor device. The representation of content, which may be provided in digital form, may be derived solely in accordance with the measure provided by the capacitance gauge until the attitude or speed variation is sensed, and then in accordance with the value of this measure applicable just prior to the sensed variation modified in accordance with the quantity changes of content as measured by the one or more flowmeters. The one or more flowmeters may be arranged to measure changes in quantity of either sense and steps will in these circumstances be taken to provide for appropriate addition to, or subtraction from, the output representation in accordance with the measured quantity.

However in certain applications, for example in a fuel system of an aircraft, the changes will normally be of one sense only.

An aircraft fuel-contents gauging system in accordance with the present invention will now be described, by way of example, with reference to the accompanying drawings, in which.

Figure 1:
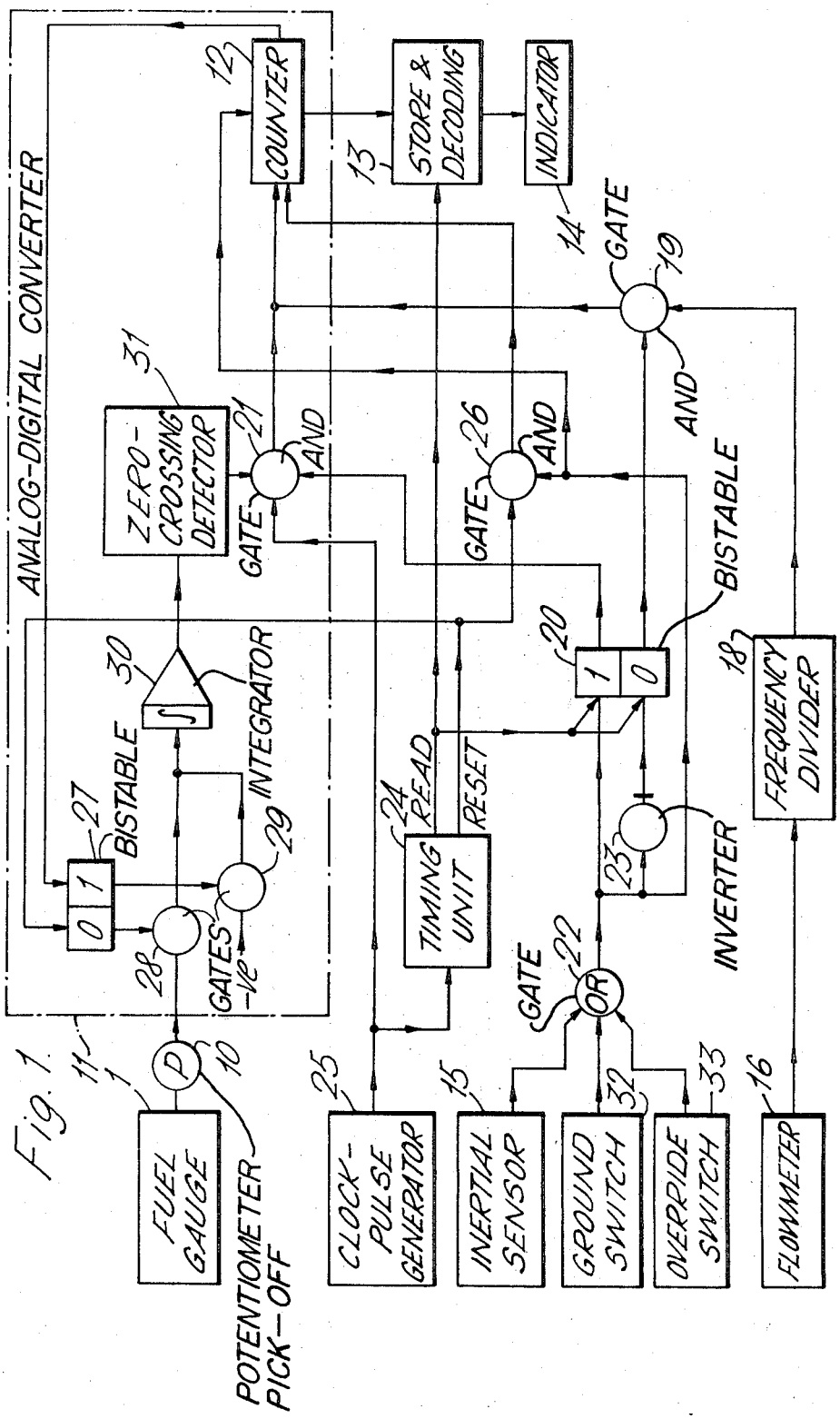
FIG. 1 is a block schematic representation of the fuel-contents gauging system.
Figure 2:
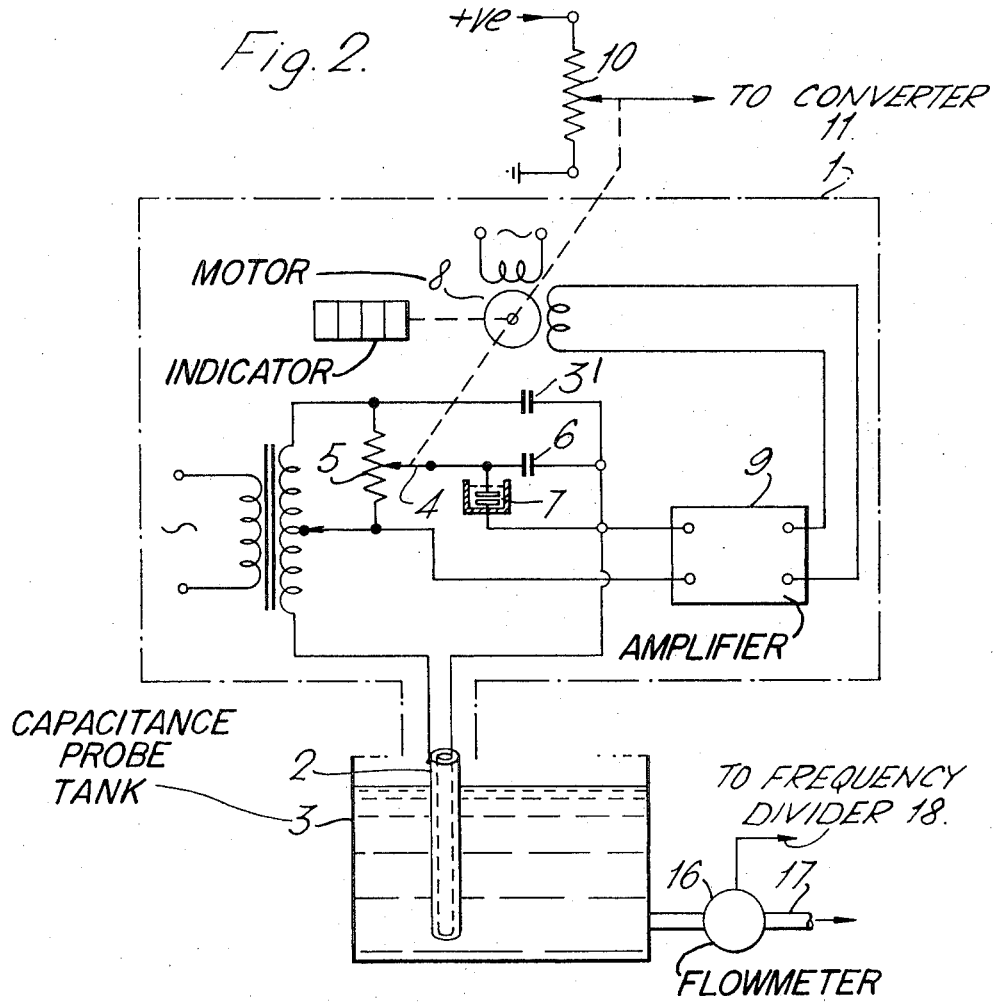
FIG. 2 illustrates the construction of a capacitance fuel-gauge that forms part of the system of FIG. 1.

Referring to FIG. 1, the system includes a conventional inferred-density capacitance fuel-gauge 1 that serves to provide a measure of the mass of fuel contained in a fuel tank of the aircraft. The fuel gauge 1 as illustrated in FIG. 2, includes a capacitance probe 2 that is characterised and mounted in the fuel tank 3 in the conventional way to provide a value of capacitance that is dependent on fuel volume. Alternating voltage derived in accordance with the capacitance of the probe 2 is balanced in a bridge network against the sum of alternating voltages that are derived via a fixed capacitor 3' and from a tap 4 of a potentiometer 5 via a fixed capacitor 6 and a reference capacitor 7 that is fully immersed in the fuel. A servo motor 8 that is energized via an amplifier 9 in accordance with any unbalance of the bridge drives the tap 4 to restore the normal balanced condition. The position of the tap 4 provides a measure of the mass content of the tank, and a unidirectional voltage in accordance with this is derived by a potentiometer pick-off 10. This voltage is supplied from the pick-off 10 to an analogue-to-digital converter 11.

The converter 11 includes a three-decade binary counter 12, and a binary-coded number in accordance with the voltage signal supplied from the pick-off 10 is accumulated in the counter 12 and then read out into a store and decoding unit 13. The binary-coded number read out is stored in the unit 13 and is there decoded into decimal form to provide signals for actuation of a magnetic decimal-drum indicator 14. The indicator 14 provides a three-digit decimal representation of the binary-coded number stored in the unit 13, and thus of the measure of mass content provided by the fuel gauge 1.

The measure of mass content provided by the fuel gauge 1 is accurate while the aircraft is in its normal level-flight attitude and neither accelerating nor decelerating to any substantial extent. Departure in roll or pitch by more than some two degrees in either sense from the level-flight attitude however, produces a change in level of fuel in the tank 3 that materially affects the extent of immersion of the probe 2 and thereby introduces error into the measure of fuel mass provided by the fuel gauge 1. Similar considerations apply during acceleration and deceleration, and steps are taken to avoid the appearance of such error in the representation of fuel mass provided by the indicator 14. To this end the system includes an inertial sensor device 15 that is responsive to the condition in which the aircraft departs significantly in roll or pitch from its normal level-flight attitude and, or alternatively, is accelerating or decelerating to any significant extent, to interrupt supply of a control signal to the analogue-to-digital converter 11 for the duration of this condition. Interruption of this control signal halts operation of the analogue-to-digital converter 11 so that the number accumulated in the counter 12 remains at the value appropriate to the measure provided by the fuel gauge 1 immediately prior to the commencement of the sensed condition. Compensation for use of fuel during the period of the interruption is made in accordance with the output signal of a flowmeter 16 that is coupled to the fuel outlet 17 of the tank 3. The flowmeter 16 provides a pulse-rate output in accordance with the mass flow through the outlet 17, and the pulses produced are at this time supplied via a frequency divider 18 and AND gate 19 to reduce the count of the counter 12 and ensure that the representation provided by the indicator 14 is appropriately up-dated.

Operation of the analogue-to-digital converter 11 in accordance with the response of the device 15 is controlled by a bistable circuit 20 and in particular by the application of a signal from this circuit 20 to an AND gate 21 in the converter 11. While the aircraft is in its normal level-flight attitude and not accelerating or decelerating, the device 15 supplies direct current via an OR gate 22 to maintain the bistable circuit 20 in its 1 state; it is only while the circuit 20 is in this state that the control signal is supplied to the gate 21. The direct current supplied by the device 15 ceases whenever there is departure by more than two degrees in roll or pitch from the level-flight attitude and, or alternatively, whenever there is acceleration or deceleration sufficient to produce comparable disturbance of the fuel level in the tank 3. Absence of this signal causes an inverter gate 23 to supply a direct-current signal to bring about switching of the bistable circit 20 to its 0 state with consequent interruption of the converter-control signal supplied to the gate 21.

Switching of the bistable circuit 20 to the 0 state and then back again to the 1 state on restoration of the direct-current signal supplied from the gate 22, is effected by a recurrent READ pulse supplied from a timing unit 24. The READ pulse and a closely-following RESET pulse are derived in the timing unit 24 by frequency division of a train of clock pulses that are generated by a clock-pulse generator 25. The RESET pulse is passed via an AND gate 26 to reset the counter 21 to zero while direct current is supplied from the OR gate 22, and is also supplied to a bistable circuit 27 in the converter 11 to set this to its 0 state.

The bistable circuit 27 controls two gates 28 and 29 and while in the 1 state opens the gate 28 to pass the voltage supplied by the pick-off 10 to an integrator 30 that integrates this with respect to time. The integral increases through zero and the instant at which the crossover occurs is detected by a zero-crossing detector 31 that then adopts a state in which it supplies a signal to open the AND gate 21. The AND gate 21 is opened by this signal to pass pulses from the generator 25 into the counter 12 only while the bistable circuit 20 is in its 1 state and the converter-control signal is accordingly being supplied to the gate 21.

The counter 12 counts the pulses supplied via the gate 21 and when it overflows to return to zero count, produces a CARRY pulse that is applied to set the bistable circuit 27 to its 1 state. In the 1 state the bistable circuit 27 opens the gate 29 to apply a reference voltage to the integrator 30 in place of the voltage from the pick-off 10. The reference voltage is applied to the integrator 30 in the opposite sense to the voltage from the pick-off 10 so that the integral accumulated decreases progressively. Clock pulses continue to be passed into the counter 12 after overflow and until the zero-crossing detector 31 detects that the integral accumulated by the integrator 30 has been reduced to zero. The signal supplied to the AND gate 21 by the detector 31 now ceases and this closes the gate 21 to stop further supply of clock pulses to the counter 12. The count of the counter 12 is now representative in binary-coded form of a time interval representative of the measure of fuel mass provided by the fuel gauge 1, and the number in this way held in the counter 12 is read out into the unit 13 to up-date the representation provided by the indicator 14, in response to the next READ pulse.

The operation of the analogue-to-digital converter 11 is repeated to generate a new, up-dated binary representation in accordance with the measure of fuel mass provided by the fuel gauge 1, in response to the next and each succeeding pair of READ and RESET pulses while direct current continues to be supplied from the gate 22. If however supply of direct current from the gate 22 is interrupted, the next READ pulse causes the bistable circuit 20 to be set to its 0 state to open the AND gate 19 to the pulses supplied from the frequency divider 18. The gate 21 remains closed and the gate 26 is no longer able to pass the RESET pulse to reset the counter 12 to zero. The counter 12 therefore retains the binary number last accumulated in accordance with the measure of fuel mass provided by the fuel gauge 1. Each pulse passed by the gate 19 from the frequency divider 18 to the counter 12 reduces this number by unity, the direction of count of the counter 12 being reversed in these circumstances by the absence of the direct-current signal from the gate 22. Thus the number in these circumstances read out from the counter 12 into the unit 13 in response to the next and each succeeding READ pulse is the number previously read out modified in accordance with the decrease in mass content of the tank 3 as sensed by the flowmeter 16. The indicator 14 accordingly continues to provide an updated representation of the mass-content of the tank, but in this is unaffected by any error in the measure provided by the fuel gauge 1 during the departure from level-flight attitude and, or alternatively, significant acceleration or deceleration.

The direct-current supply from the inertial sensor device 15 is restored as soon as the aircraft returns to its normal attitude without significant acceleration or deceleration. The bistable circuit 20 is accordingly returned to its 1 state and operation of the analogue-to-digital converter 11 in translating the measure of fuel mass provided by the fuel gauge 1 into a number for display by the indicator 14 is resumed.

The system is required to provide a representation of fuel mass directly in accord with that provided by the fuel gauge 1, while the aircraft is on the ground. To this end a switch 32 is associated with the landing gear to be operated and supply direct current to the OR gate 22 while the aircraft is on the ground. This is effective to ensure that the bistable circuit 20 remains in its 1 state and the converter 11 remains operative, irrespective of whether or not direct current is supplied by the device 15. A manually-operable switch 33 is also provided and operation of this by the pilot is also effective to supply direct current to the gate 22 and override the control exerted by the device 15.

The function of the device 15 may be performed by a specially-provided inertial sensor device as described, or alternatively by one or more instruments already provided in the aircraft flight instrument system.

Although only one probe 2 is described as being provided in the fuel gauge 1, there will normally be two or more connected in parallel, one to be specially responsive to the lower levels of fuel in the tank and at least one other to the upper levels. There is in this nonetheless a considerable saving in the number of probes and associated cabling, over what would be required to achieve a comparable degree of accuracy of output representation through the same range of attitude variation; in one specific example there is a saving of some nine probes with a reduction in maximum attitude-error to ±0.2 percent of the maximum fuel content over the whole range from full to empty (this compares with an error of ±1.9 percent when full and 0.8 percent when empty, obtained using conventional attitude-error correction techniques). Furthermore, the location of the probes is less critical.

The system described can clearly be extended to provide representation of the total mass of fuel contained by two or more tanks. It is necessary in this case simply to provide capacitance probes corresponding to the probe 2 in each of the tanks and to connect them all in parallel with one another in the bridge circuit of the fuel gauge 1.

The flowmeter 16 is described above as associated with the outlet 17 of the tank 3, but it may be provided more directly as part of the fuel-supply system on the aircraft engine. Where two or more engines are provided more than just one flowmeter may accordingly be involved, but the pulse outputs from these can nonetheless be readily combined to provide a single input to the frequency divider 18. In these latter circumstances it will normally be necessary to take special steps to ensure that coincident pulses from the different flowmeters are given due weight and not passed on as a single pulse. An anti-coincidence circuit suitable for use in the latter respect where two flowmeters are involved, is shown in FIG. 3.

Figure 3:
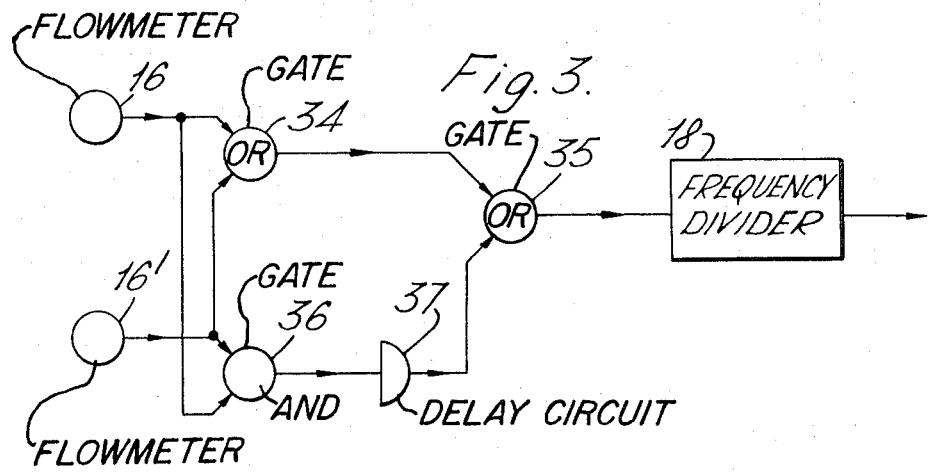
FIG. 3 is a schematic representation of an anti-coincidence circuit that may form part of the system of FIG. 1 in certain circumstances referred to later in the description.

Referring to FIG. 3, the pulses from both flowmeters 16 and 16' are passed to the frequency divider 18 via two OR gates 34 and 35. A single pulse is passed on via the two gates 34 and 35 if there is coincidence, but there is also response of an AND gate 36 to this condition and this then supplies a further, compensatory pulse to the gate 35 via a delay circuit 37. The delay provided by the circuit 37 is chosen to ensure that there is no overlapping at the gate 35 between the compensatory pulse and any pulse supplied directly through the gate 34.

We claim:

1. In a liquid-contents gauging system for use in a craft and including gauging means to provide a measure of liquid content which is dependent on liquid level and which is subject thereby to errors arising from craft manoeuvrings, the combination comprising: output means for providing an output representation of liquid content corrected at least partially for said errors, said output means including a single pulse counter for providing a count dependent on said liquid content, and means for providing said output representation in accordance with said count; first up-dating means coupled to the said pulse counter for operating said counter in a first mode in which the count of said counter is repeatedly brought to an up-dated value in accordance with said measure provided by said gauging means; means responsive to manoeuvring of the craft to interrupt operation of said first up-dating means temporarily through said craft manoeuvrings with the count of said counter arrested at the last up-dated value; and second up-dating means responsive to quantitative changes during the period of interruption, said second up-dating means comprising flowmeter means for supplying pulse signals in accordance with the rate of quantitative change of said liquid content, and means for operating said counter during said period in a second mode which is distinct from said first mode and in which said pulse signals are applied to the said pulse counter to effect stepwise change in said count for the arrested value, said stepwise change in count being made in accordance with the successive ones of said pulse signals at a rate dependent on the said rate of change of liquid content.

2. A liquid-contents gauging system according to claim 1 wherein said gauging means comprises an electrical capacitance device for immersion in said liquid to provide a value of capacitance that is dependent on the liquid level, and an electrical circuit responsive to said value of capacitance to provide said measure of liquid content in accordance therewith.

3. A liquid-contents gauging system according to claim 1 wherein said means to interrupt operation of said first up-dating means includes inertial sensing means to respond to changes in attitude and speed of the craft.

4. A system for providing an output representation dependent on the content of a liquid container in a craft, comprising gauging means for providing a measure of said content dependent at least partially on liquid level in said container, means for responding to successive quantitative changes in liquid content of the container to provide pulse signals in accordance therewith, output means operable in a first mode in which it provides said output representation varying in accordance with variation in said measure, said output means being switchable selectively from said first mode to a second mode in which it is operative to provide said output representation varying in dependence upon said pulse signals from a value of said output representation applicable prior to said switching, and inertially-responsive means to effect switching of said output means to its said second mode of operation in dependence upon attitude and speed changes of the craft, said output means including a pulse counter, first pulsing means for pulsing the counter to bring it repeatedly to a value of count in accordance with said measure, switch means switchable to a condition in which said repeated pulsing of the counter by said first pulsing means is interrupted with the count of the counter arrested at the last said value thereof, and second pulsing means responsive to switching of the said switch means to said condition to apply said pulse signals to the counter so as thereby to modify the count of the counter stepwise from said arrested value in dependence upon the successive quantitative changes in liquid content while said switch means is in said condition.

5. A system according to claim 4 wherein said first pulsing means is means operable to perform repeatedly an operational sequence in which the counter is firstly reset and then pulsed to a count in accordance with said measure, and said switch means is means switchable to a condition in which repetition of the said operational sequence is interrupted with the count of the counter arrested at a value dependent upon said measure of liquid content prior to this switching.

6. A system according to claim 5 wherein said inertially-responsive means is operative to effect switching of said switch means only in the event that a predetermined threshold is exceeded by said attitude and speed changes.

7. A system according to claim 5 wherein said means for responding to quantitative changes in liquid content includes at least one flowmeter coupled to an outlet of said container to monitor flow of liquid therefrom.

8. A system according to claim 4 including switch means operable to inhibit switching of said output means to said second mode.

9. In an aircraft, a system according to claim 4 for providing an output representation in accordance with fuel contents of the aircraft, and switch means operable in response to the condition in which the aircraft is stationary to inhibit switching of said output means to said second mode.

* * * * *